United States Patent [19]

Weber et al.

[11] Patent Number: 4,820,169

[45] Date of Patent: Apr. 11, 1989

[54] PROGRAMMABLE MODULAR CONNECTOR ASSEMBLY

[75] Inventors: Ronald M. Weber, Lebanon; Robert C. Swengel, Jr., York; Charles H. Weidler, Lancaster; James H. Wise, Palmyra, all of Pa.

[73] Assignee: AMP Incorporated, Harrisburg, Pa.

[21] Appl. No.: 907,696

[22] Filed: Sep. 15, 1986

Related U.S. Application Data

[63] Continuation-in-part of Ser. No. 855,225, Apr. 22, 1986.

[51] Int. Cl.[4] .............................................. H01R 9/00
[52] U.S. Cl. ...................................... 439/65; 439/717
[58] Field of Search ................. 439/64, 65, 76, 629, 439/715, 717

[56] References Cited

U.S. PATENT DOCUMENTS

| | | | |
|---|---|---|---|
| 4,322,120 | 3/1982 | Rilling | 439/717 |
| 4,451,107 | 5/1984 | Dola et al. | 439/65 |
| 4,632,475 | 12/1986 | Tomita | 439/65 |

Primary Examiner—Joseph H. McGlynn
Attorney, Agent, or Firm—Katherine A. Nelson

[57] ABSTRACT

A connector assembly includes modules which intermate to interconnect electrical circuits between mother and daughter printed circuit boards. The modules are provided with resilient projections which latch on relative rotation of the modules, enabling the handling of resultant modular assemblies. High current carrying terminals of the modules have contact posts of different spacings and lengths from a contact point to assure equal resistivity to avoid hot spots for high current. A polarizing key locking feature is provided by a snap ring including a slot to permit engagement and disengagement by a simple tool such as a screwdriver.

12 Claims, 12 Drawing Sheets

PROGRAMMABLE MODULAR CONNECTOR ASSEMBLY

This is a continuation-in-part application of U.S. patent application Ser. No. 855,225 filed Apr. 22, 1986, the disclosure of which is incorporated herein by reference.

FIELD OF THE INVENTION

The present invention relates to a programmable modular connector assembly for electronic packaging and, particularly, to an assembly for the distribution of power between printed circuit boards for use in data processing units of computers. It features modules which interlock each with the other to form the intermating halves of a connector assembly with different style modules for different power levels and for providing polarization featuring dimensions considerably smaller than heretofore possible with power type interconnections.

BACKGROUND OF THE INVENTION

In times past, the architecture utilized for business machines, data processing, computers and the like, has generally been one which did not require high levels of distributed power. Rather, the power requirements were confined to a separate power supply unit with the several processor, compiler, logic or memory functions readily handled by power levels supplied by five, ten, or fifteen amperes. A typical power connector is hown in U.S. Pat. No. 4,234,436 issued Sept. 23, 1980 to Zimmerman et al.

With the advent of higher complexity and speed of data processing and increasingly dense semiconductor packaging, the need for power distribution onto mother boards and even down to the daughter board level, has gradually arisen. However, difficulty has been encountered in adapting existing power type connectors and screw-down terminals to the electronic packaging required. The large terminal lugs utilized for power suppliers of a few years ago and the associated connectors heretofore used are simply too large, too cumbersome, and too difficult to use to satisfy present packaging requirements.

As a second aspect of the background of the invention, there are a number of power connectors which support to be modular, including the type shown in the publication *AMP Engineering and Purchasing Guide*, published by AMP Incorporated, Harrisburg, Pa. 17105, pages 10-3, 10-5, copyright 1976. One of the problems with using connectors of this type for power distribution is that the axial stresses and loads necessary to generate high normal forces for the higher current carrying capability of their contact systems require special treatment when such are applied to printed circuit boards and the relatively fragile circuit structures associated therewith. Additionally, experience has revealed problems of utilizing terminal contacts of the type shown with solder production techniques as well as problems with current distribution in such contacts in use at the higher current levels. This latter problem is one of concentration of current density with a resulting heating creating hot spots and possible de-soldering inherent in the contact design.

Finally, with respect to power connectors of the type embraced by the present invention, there is a need for a polarization which is flexible and adaptable and more readily changeable than heretofore available, prior teaching being found in U.S. Pat. No. 3,491,330 issued Jan. 20, 1970 to H. E. Barnhart et al.

OBJECTS OF THE INVENTION

Accordingly, it is an object of the invention to provide a board-to-board pluggable connection using a connector assembly which is programmable in the sense of being able to mix several different types of power connectors with polarization modules to form a connector assembly for interconnecting printed circuit boards. It is a further object of the invention to provide a connector assembly having power distribution modules of relatively high current level to make power distribution in electronic packaging more feasible. It is yet a further object to provide power contact terminals capable of carrying currents on the order of fifteen to fifty amperes or more with minimum stresses generated to their associated board members and with power distribution characteristics optimized. It is yet a further object to provide a novel and compact polarization structure capable of being readily changed to provide a number of different settings easily and quickly and with simple tools.

All these objects should be achieved by structures which are capable of being manufactured by conventional mass production techniques to permit economic feasibility.

BRIEF DESCRIPTION OF THE INVENTION

According to the invention, there is provided a modular connector assembly for distributing different levels of power between printed circuit boards, as for example, from a mother board to a daughter board. The connector assembly is modular in the sense that it contains a number of individual connector modules which mate each with the other and interlock in a novel fashion to form a composite connector half which can be handled independently of the structure of the printed circuit board to which the half is attached. These modules are of mixed type with a variety of power carrying contacts, polarization modules, and even signal modules. All have relatively low profiles and dimensions such that, when interlinked to form a modular connector assembly half, are prealigned for intermating with a corresponding modular connector assembly half similarly interlinked and mountable on printed circuit boards to form the power distribution for circuit functions. In consequence, the circuit boards may be connected and disconnected from each other for servicing or repair by a simple plugging action.

In accordance with the invention, a variety of different power level terminals are provided for the connector assembly which feature an intermatability and functioning which is self-contained in terms of maintaining relatively high force contacts without stressing unduly the connector assembly and board associated therewith. The contacts each have multiple current carrying legs dimensioned to ensure even distribution of current from the contact points of intermating to the current carrying conductors of the boards on which they are mounted.

Polarizing modules include polarizing elements which may be rapidly fixed in position to provide a particular polarization without a requirement for other than a rudimentary tool, and yet provide a wide variety of polarization possibilities.

DETAILED DESCRIPTION OF THE INVENTION

Figure 1A:
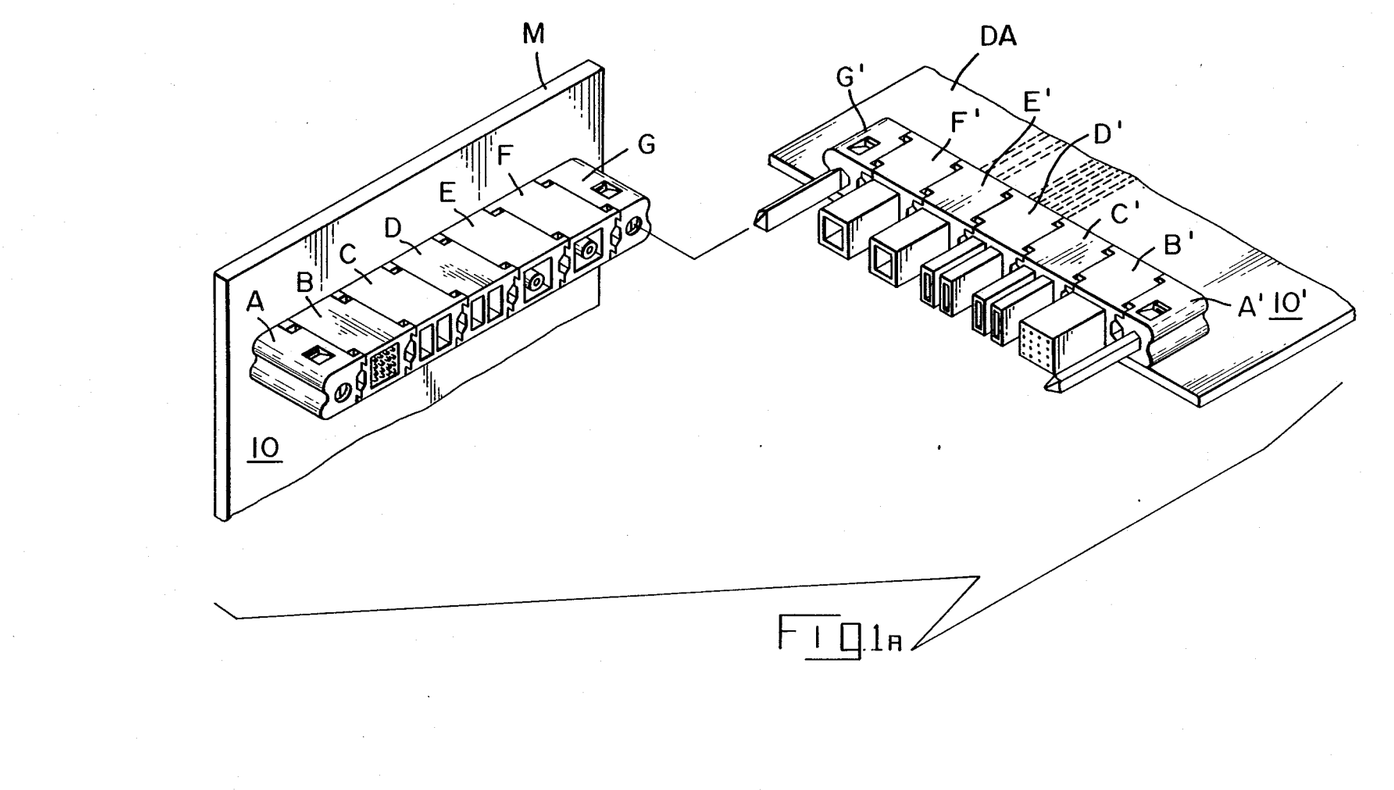
FIG. 1A is a perspective view showing the mating halves of the modular connector assembly of the invention mounted on printed circuit boards in order to distribute power from one to the other of the boards.
Figure 1B:
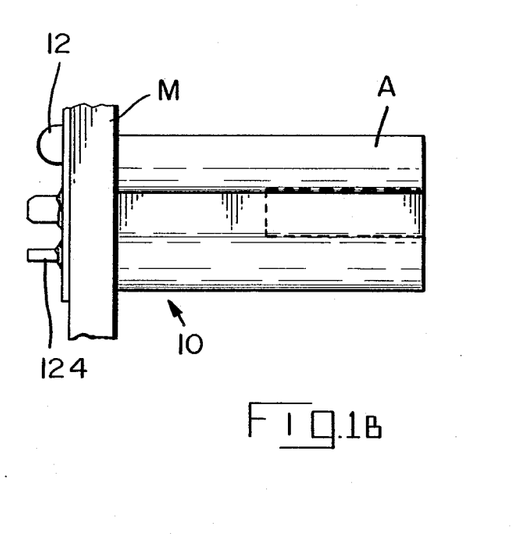
FIGS. 1B and 1C are side elevational views of one end of the connector assembly of FIG. 1A, the mother and daughter boards, respectively.
Figure 1C:
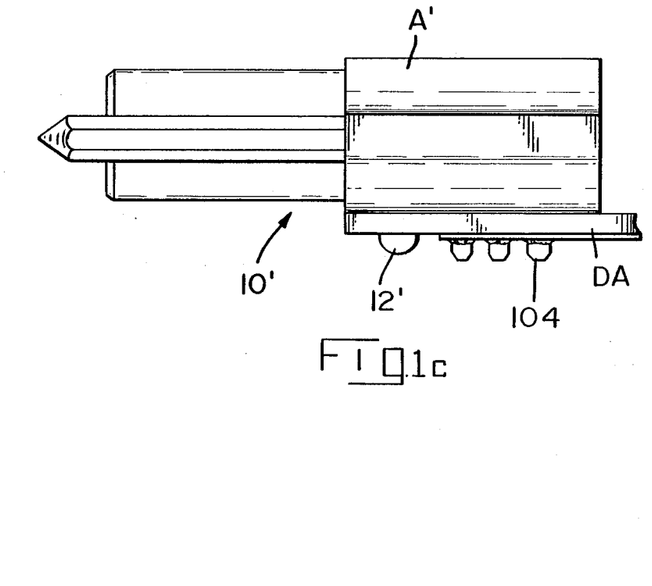

Referring now to FIGS. 1A, 1B, and 1C, references is first made to those constituents of an electronic package labeled "M" for mother board and "DA" for daughter board, which form the essence of electronic packaging in a wide array of functional devices. The mother board is employed to carry signals to and from system, along with appropriate grounding paths and power. The daughter board more typically contains the actual functioning elements, logic and memory, for controllers, microprocessors, and a host of other circuit entities. With respect to FIGS. 1A-1C, a connector assembly has halves 10 and 10' which carry the various power, ground, and signal circuits from the mother board M to the daughter board DA, it being understood that, in a typical application, there would be a plurality of daughter boards for each mother board, with each board DA representing a given function of the system.

Board DA, through its associated connector assembly half 10', is plugged into board M through its connector assembly half 10 to interconnect the circuit paths shown in phantom in an exemplary fashion in the FIGS. 1A-1C. It is to be understood that board DA will be unplugged from and re-plugged to board M for repair, replacement, upgrading, or a variety of useful purposes. While not shown and not always necessary, it is to be understood that a card guide or card cage may be utilized in conjunction with board M to accommodate and hold board DA or members like DA in an overall structural package. In the illustrative embodiment of FIG. 1A, connector assembly modules are shown and labeled A through G, and A' through G'. Modules A and G are polarizing modules which mate with corresponding modules of half 10' labeled A' and G'. Module B is included to show a type of signal module which may be included with the assembly of the invention having multiple pins and sockets, but which will hereinafter not be described in detail. Modules C and D represent one form of current carrying connector, and modules E and F represent another kind of power module having a power capacity higher than that of C and D.

Also shown particularly in FIGS. 1A and 1C is the relationship of projections 12 and 12' which are integral with the housings of the modules, and which fit within holes within the printed circuit boards, respectively, to hold the modular connector assembly half in position prior to soldering or other operations during assembly of components onto circuit boards. Also shown in FIGS. 1B and 1C are the terminal legs 104, 124, respectively, which extend through the mother and daughter boards and are soldered thereto to effect an interconnection of the circuit paths thereon to the connector terminals contained within the housings C and C'. Also shown particularly in FIGS. 1A-1C are polarization elements which will be hereinafter detailed, and which are arranged in projecting male and receptacle female relationship so as to intermate first and, thus, give guidance for the subsequent engagement of the projecting portions of the half 10' into the corresponding cavities of the mother board connector half 10.

In summary, the invention connector assembly may be seen to be comprised of a variety of different types of modules which nest with each other to form a connector assembly half and fit within the printed circuit boards of a circuit assembly to carry electrical and electronic circuit paths in distribution from primary to secondary package.

Figure 2:
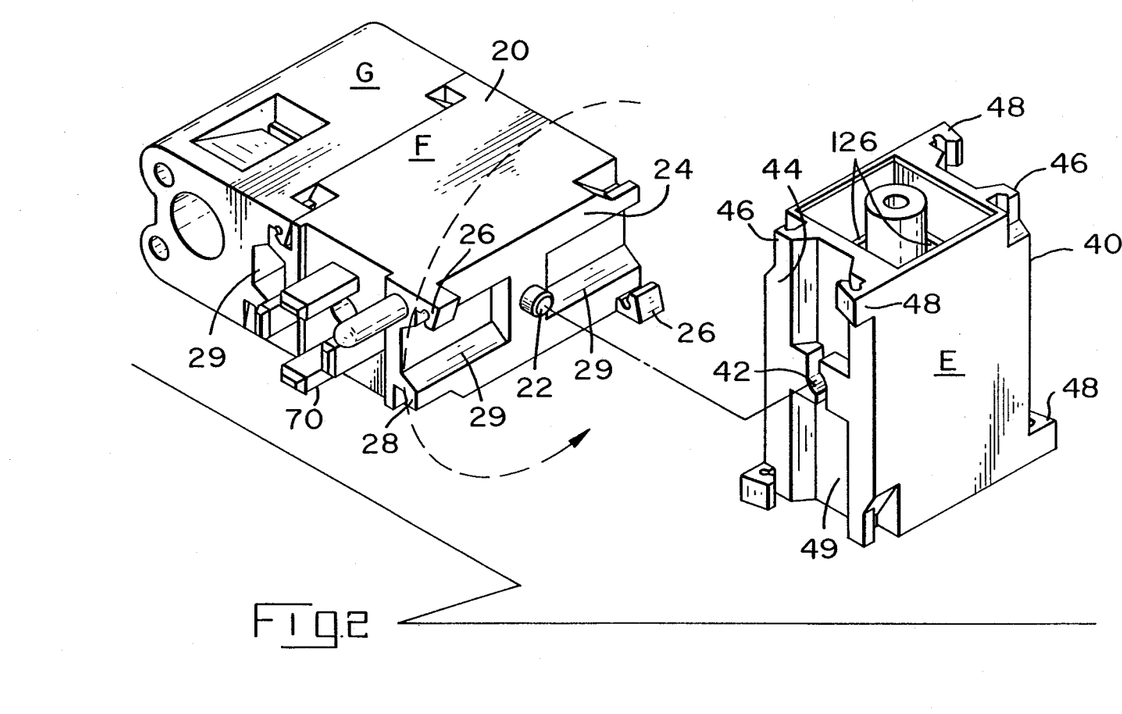
FIG. 2 is a perspective view showing adjacent modules of the assembly of FIG. 1A.

In FIG. 2, the rear side of modules G and F, and module E, are shown after unlatching from F. The modules E, F, and G may typically be made to include an outer shell or housing member such as shown with respect to F as 20, which is made to contain a terminal of suitable conducting material to be hereinafter detailed, such terminal being shown as including a leg 70 respectively, rear or terminating portions seen to project from F in FIG. 2. The forward portions of contact spring elements 126 can be seen in part protruding forward in module E. The linking of the modules can be achieved manually by grasping module E between thumb and forefinger, rotating through ninety degrees, and moving to the left, in FIG. 2, so that projection 22 enters socket 42 of module E, module E being vertical as shown. Thereafter, E is rotated ninety degrees relative to module F.

As this is accomplished, module E is pressed against the module F so that the face of housing member 20 shown as 24 presses against the face 44 of module E, so that latching projections integrally moulded with the housing member 26 and 28 engage complementary portions of a housing member 40 of module F. All the electrical power modules include, on opposite faces, similar portions permitting linking of the different modules, with the exception of the end modules which contain appropriate latching projections on one side only.

Figures 3A, 3B:
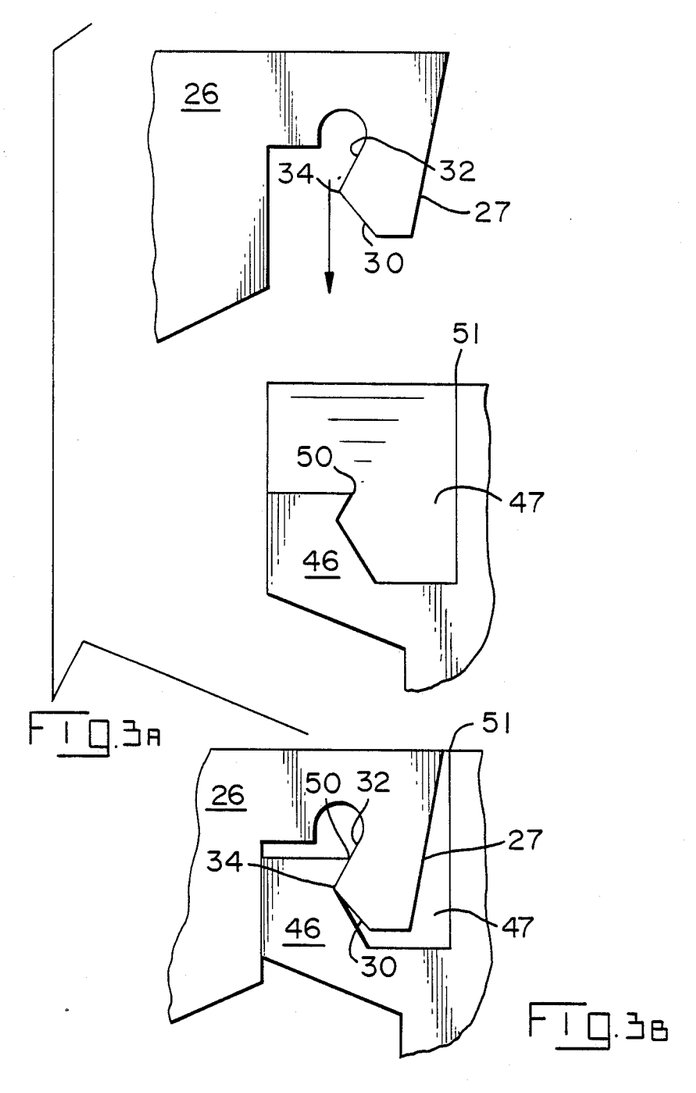
FIGS. 3A and 3B are side views, much enlarged, of the latching structures of the modules.

As shown in FIGS. 3A and 3B, during latching, the resilient latching projection 26 enters a cavity 47 associated with projection 46. Portion 26 includes leading surfaces 26 and 27 and are tapered relative to the axis of closure of the module halves in opposite senses so that, as 26 approaches 46, it will be guided therewithin with relative ease and engage with an overcentre snap action when apices 34 and 50 ride over each other. The dimensions of the housing members 20 and 40 are such that, as the latches are engaged, housing surfaces will bottom so that the outer flat surface portions of 20 and 40 are parallel and form, in essence, a flat level surface.

It is to be pointed out that the rotary latching action of the modules, in essence, locks the modules together so that the subassembly of a connector half may be configured, handled, and loaded into a printed circuit board without falling apart or risk of the relative displacement of modules, which could cause subsequent mating problems. It is also pointed out that this is not the case with modules that link by translational sliding together along the mating axis or transversely thereof.

The foregoing action of engagement and latching of the modules of the present invention further permits subassembly and handling of the modules without the use of additional frames or holding and mounting structures prior to loading into printed circuit boards. With respect to the housing members of the modules, it is to be observed in FIG. 2 that cavities 29 are provided which correspond to cavities 49 in housing member 49 of E, such that when the modules E and F are mated, cavities of hexagonal shape cross section are developed. These cavities serve the purpose of reducing plastic usage and provide cooling spaces.

Referring now to FIGS. 4A, 4B, 5A and 5B, as shown, electrical terminals of mating terminals 60 and 80 are fitted within the modules C and C' to effect a power connection therebetween. Terminal 60 thus terminates a conductive path 71 on board DA and the terminal 80 terminates a conductive path 81 on board M. Terminal 60 includes a forward U-section receptacle contact portion 62, relatively long and narrow, which is formed with longitudinal and transverse embossments 64 and 65, which stiffen portion 62. A locking barb 66 extends from the base of the U and engages an interior projection of the housing member of module C' to latch the terminal 60 therewithin. The mouth portion 60 is beveled at 67 and there are included on the rear end upstanding projections 69 which anchor an insulating cap described below.

Figure 4A:
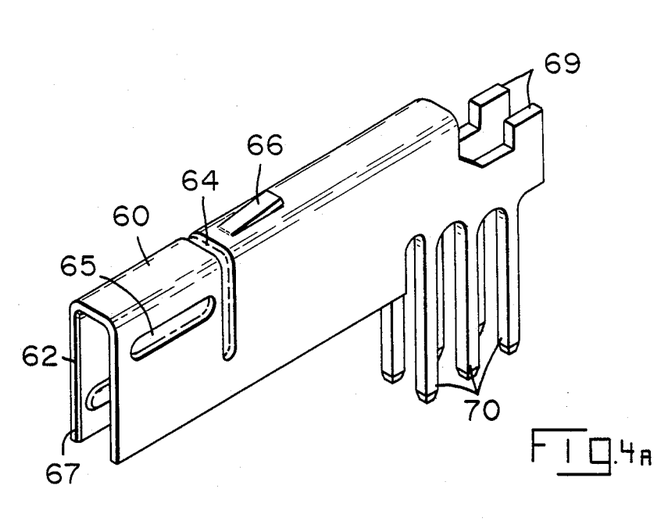
FIGS. 4A and 4B are, respectively, much enlarged perspective views of the matable current carrying contact terminals.

Projecting at right angles to the mating axis, as shown in FIG. 4A, are a row of three pairs of aligned posts 70 which fit through apertures in the daughter board DA and are terminated to path 71 by soldering to carry current through the terminal 60 to the daughter board. Rearwardly successive posts are of decreasing effective length with respect to the daughter board DA (as shown in FIG. 5B) to balance out the effective resistance of the terminals, the bulk resistance of the forward posts being increased relative to the rearward posts, so that current flowing through the terminal 60 will be more evenly distributed. This evens out the heat generated by current flow as the terminal provides six paths of relatively equal total resistance to the current carried by terminal 60 and to conductive foil 71 of board DA. As can be seen by the cross section in FIGS. 5A and 5B, the rear portions of terminal 60 are of thicker stock than the forward portion better to carry high currents concentrated therein.

Equalizing the current flow by varying the length of the posts enables the posts to be of standard cross-sectional size, obviating any requirement for the provision of nonstandard conductive pads on the circuit boards which would add to the cost of application. In addition, this enables the posts to be located in spaced-apart relation, providing both a stable mounting for the terminal and an evenly distributed current flow in the circuit board.

Figure 4B:
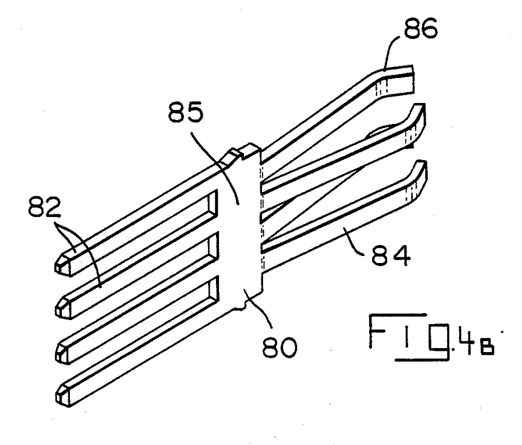

As shown in FIG. 4B, terminal 80 includes multiple contact posts 82 and a like number of forward cantilever spring contact fingers 84 aligned with respective posts, providing conductive paths of equal length and resistance from the mother board to the forward portion 62 of the mating terminal 60.

Alternate fingers 84 diverge from a planar body portion 85 and their ends 86 are curved back towards each other in opposite senses, permitting mating with terminal 60 without stubbing and providing multiple points of contact on the opposite sides of the terminal 60 for optimum current distribution. The male terminal is very inexpensive to manufacture yet provides an effective current carrying connection.

Terminals 60 and 80 are preferably made of a high conductivity material, better than ninety percent IACS, the conductivity of the international standard for copper. For reference, the thickness of the terminal 60 in its thickest portion was on the order of 0.030 inches and the thickness of the contact element 80 was on the same order of thickness, with the spring fingers having a length from root to contact point on the order of 0.37 inches. The contact surfaces of both terminals were plated with silver over nickel to a thickness appropriate to power contacts. The posts 70 and 80 were typically plated with matte tin finish suitable for soldering processes.

Figure 5A:
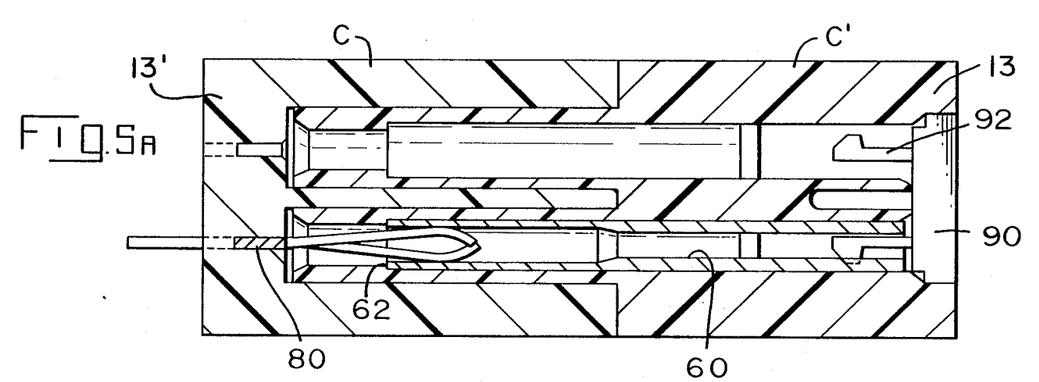
FIGS. 5A and 5B are sectional views in orthogonal planes showing a mated current carrying module with the contacts of FIGS. 4A and 4B.
Figure 5B:
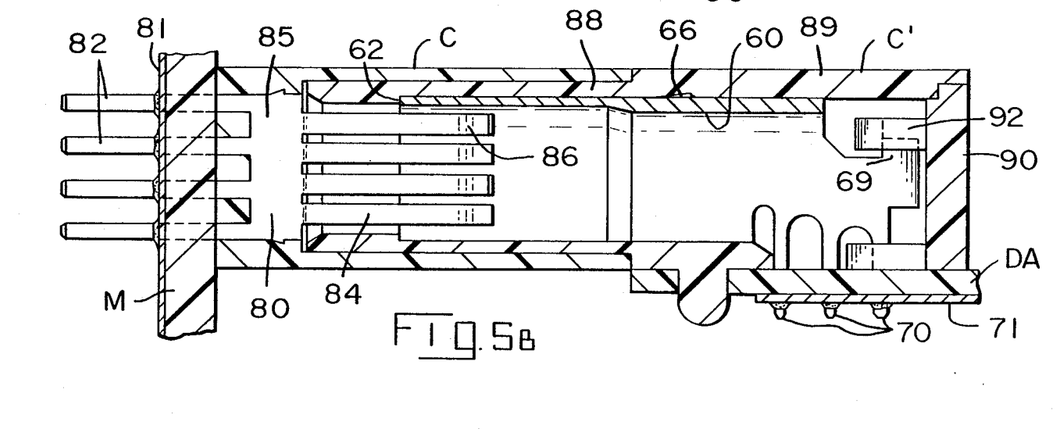
Figure 5C:
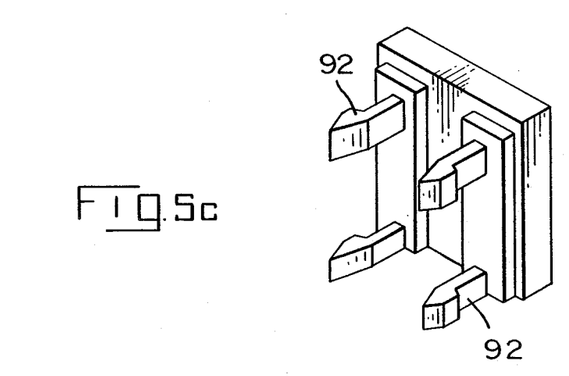
FIG. 5C is a perspective view of a cap member utilized in the connector of FIGS. 5A and 5B.

As can be discerned from FIGS. 5A, 5B and 5C, the mating portions of the housing members of module pairs C and C' are in a male-female configuration, with the contact elements recessed from the forward faces thereof in order to avoid shorting. The housing member of module C' is open-ended and molded with deformed tubular portion 88 and a channel section rearward portion 89 with the channel mouth open to the circuit board. A plastic dielectric cap member 90 snaps into the rear of module C' by fingers 92 engaging the projections 69 and the rearmost of the legs 70 of terminal 60. The provision of plug 90 assures insulation of the terminals 60 while permitting the housing member to be molded in a simple straight-draw mold.

The contact system including terminals 60 and 80 has a design rating in excess of fifteen amperes at 280 volts D.C. so that each module C' has a design rating of thirty amperes or better. It should be noted that this relatively high current rating is achieved in a very narrow boxlike configuration which is of considerable importance in minimizing use of board real estate, possibly the most costly aspect of multilayer and heavy gauge, high-current, printed circuit board manufacture.

In the embodiment, the housing member of modules C and C' were made of 420 SEO VALOX, a G.E. engineering plastic having temperature rating of 150° C.

Figure 6A:
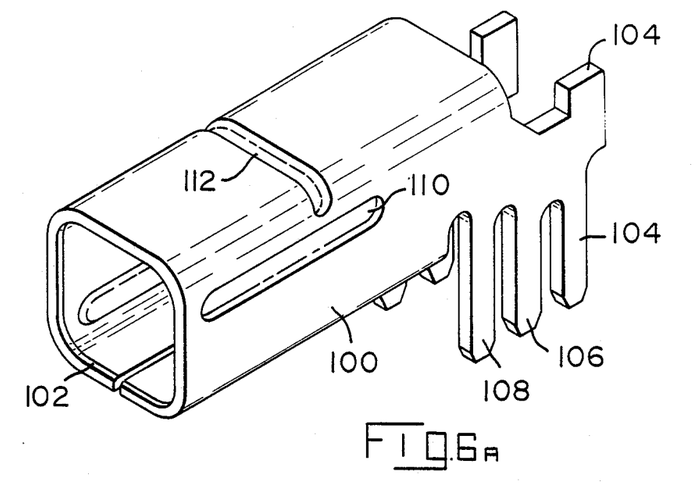
FIGS. 6A and 6B are perspective views of the male and female versions of higher current carrying power contact terminals of the invention.
Figure 6B:
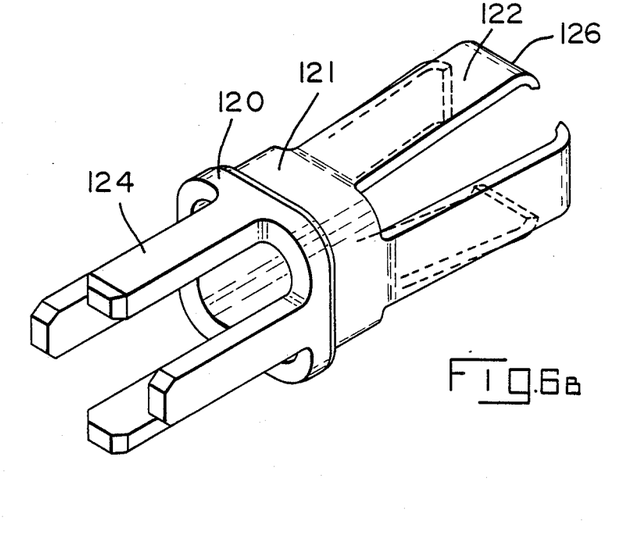
Figure 7:
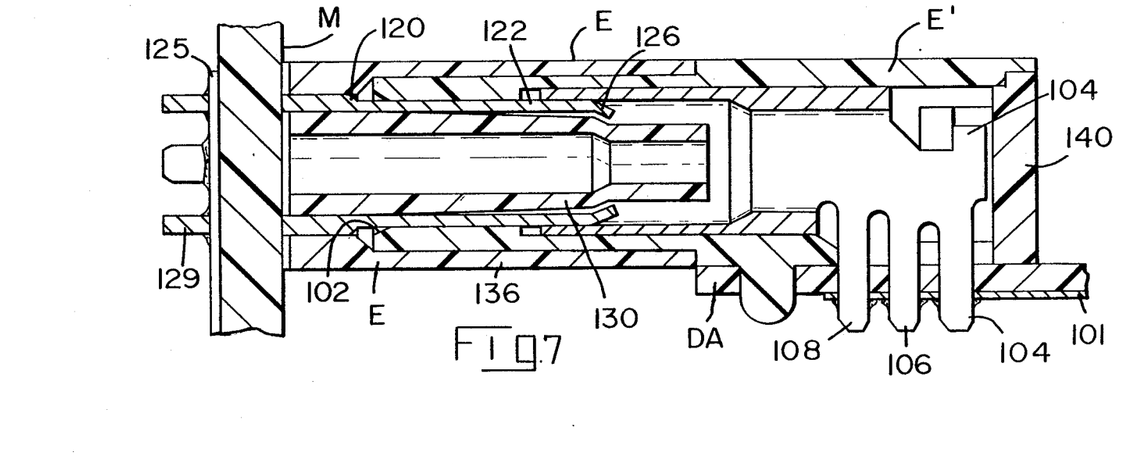
FIG. 7 is a partly sectional view of a connector incorporating the contacts of FIGS. 6A and 6B.

Referring now to FIGS. 6A through 7, there are shown other, higher currently carrying modules, including a female terminal 100 of modules E' and F' for mounting in the daughter board DA and a male terminal 120 of modules E and F and associated with the mother board. Terminal 100 includes a forward, mating receptacle portion of rectangular cross section, the front end of which includes a beveled surface 102 to minimize stubbing, and the rear board connecting portion of which includes upstanding projections 104 for mounting cap member 140 (FIG. 7) which serve to engage in a similar fashion to that described above.

A row of pairs of posts 104, 106, 108 extend along a rear of the terminal, having different lengths for even current distribution to the daughter board circuit paths 101. Terminal 100 is also of dual thickness stock with a thinner receptacle portion and a correspondingly thicker rear portion to improve conductivity. Terminal 100 may be formed with longitudinally and transversely extending embossments 110 and 112 providing transverse and longitudinal stiffening.

The male terminal 120 is made of dual thickness stock and includes a series of cantilever spring contact fingers 122, extending generally coaxially forwardly and rearwardly, respectively, from locations equally spaced around the periphery of a tubular body portion. The contact fingers 122 diverge radially outwardly towards their free ends which are bent inwardly to avoid stubbing on mating.

The housing member of module E is integrally molded with a centrally located, forwardly extending, tapering tubular projection 130, having a free end of further reduced diameter extending beyond the free ends of the terminal, the body portion and contact fingers of which are received in a recess defined between the projection 130 and an outer wall 136 of the module. The divergence maintains a separation between the projection 130 and contact portions of the contact finger adjacent the free ends, and avoids a rolling action on engagement with the housing of module E'.

The spacing between the free end of the projection and the outer wall of the module housing member is sufficiently small to preclude entry of a finger portion inadvertently to contact the finger 122 in the unmated condition.

The stock for terminal 100 was, in this example, made of the Olin material previously mentioned, with a maximum thickness of 0.048 inches and a minimum thickness of 0.030 inches. The terminal 120 was similarly comprised and of stock 0.048 inches in thickness. The spring fingers 122 were roughly 0.150 inches in width, and 0.450 inches in length. This provided a design rating for the terminals of 50 amperes at a voltage of 280 D.C. with a heat rise characteristic of 20° delta temperature. The rubbing and bearing contact interfaces of 100 and 120 were plated similarly to those described above.

Figure 8A:
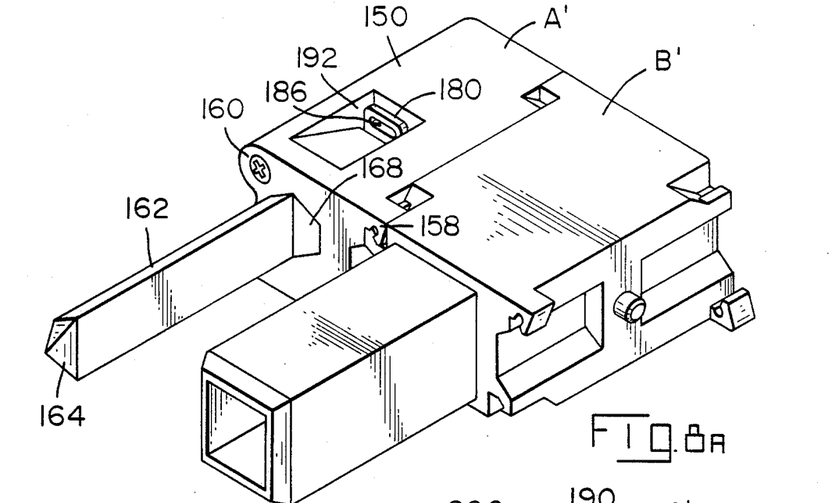
FIG. 8A is an enlarged perspective view of a polarization and adjacent module shown in FIG. 1A.
Figure 8B:
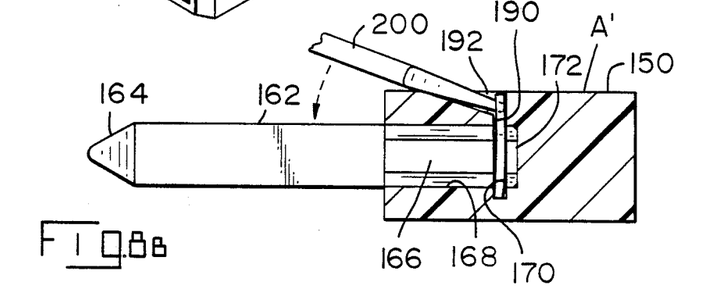
FIG. 8B is a side elevational view of the modules of FIG. 8A, partly in section.
Figure 8C:
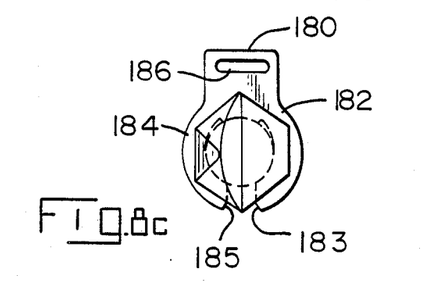
FIG. 8C is an end view of the detent locking ring utilized to lock the polarization plug in place in the housing.

As shown in FIGS. 8A–8C, the polarizing module A' includes a housing member 150 molded of a suitable dielectric plastic material.

The ends of each housing member 150 have profiles 160 providing fingerpieces to facilitate handling. A blind-ended hexagonal cavity 168 opens to the mating face and is intersected by a slot 190 formed at the base of access recess 192. Projecting from the mating face of 150 is a mating part of a polarizing plug 162 of a semihexagonal shape having a forward beveled or pointed end 164 providing a lead-in surface to assist in intermating. A rear hexagonal mounting portion 166 of the plug fits within the hexagonal cavity 168 of the housing member. A peripheral groove is formed adjacent the rear end of portion 166 defining a locking head 172. A snap ring 180 is inserted through the counterbore 192 so that legs 182 and 184 of the snap ring are received in the groove 170 to lock the plug in the housing cavity 168. Free ends of the legs 182, 184 are formed with beveled surfaces such as 183 and 185, to facilitate movement of the snap ring into the groove. Snap ring 180 is preferably bowed, as shown in FIG. 8B, to provide frictional retention within 190 and has a removal eye 186 concealed within the recess 192 to prevent inadvertent dislodgement.

A tool such as the blade of a small screwdriver 200 can be inserted along recess 192 and into eye 186 to lever out the snap ring 180 upwardly, releasing the rear body 166 for axial withdrawal from the cavity 168 and reorientation. Reverse leverage may be used to urge the snap ring into locking engagement in the groove.

Figures 8D, 8E:
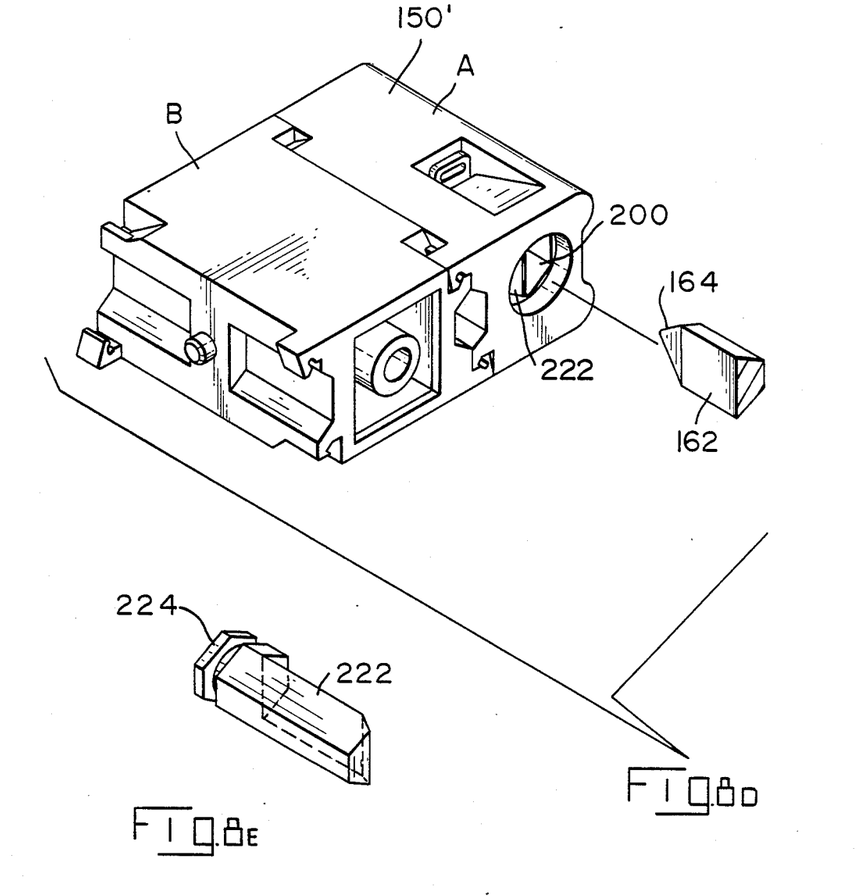
FIG. 8D is a perspective view, much enlarged, of the polarization module which mates with the module shown in FIGS. 8A and 8B.
FIG. 8E is a perspective of the receptacle which intermates with the polarization plug of FIGS. 8A and 8B.

As shown in FIGS. 8D and 8E, the mating polarizing module 150' is of similar construction, including a hexagonal cavity 220 into which is locked a polarizing key 222 with a head 224 at the rear end of a short mounting portion extending from a short semihexagonal mating portion concealed within the cavity defining, with the cavity wall, a socket receiving the polarizing projection 162.

Figures 9A, 9B:
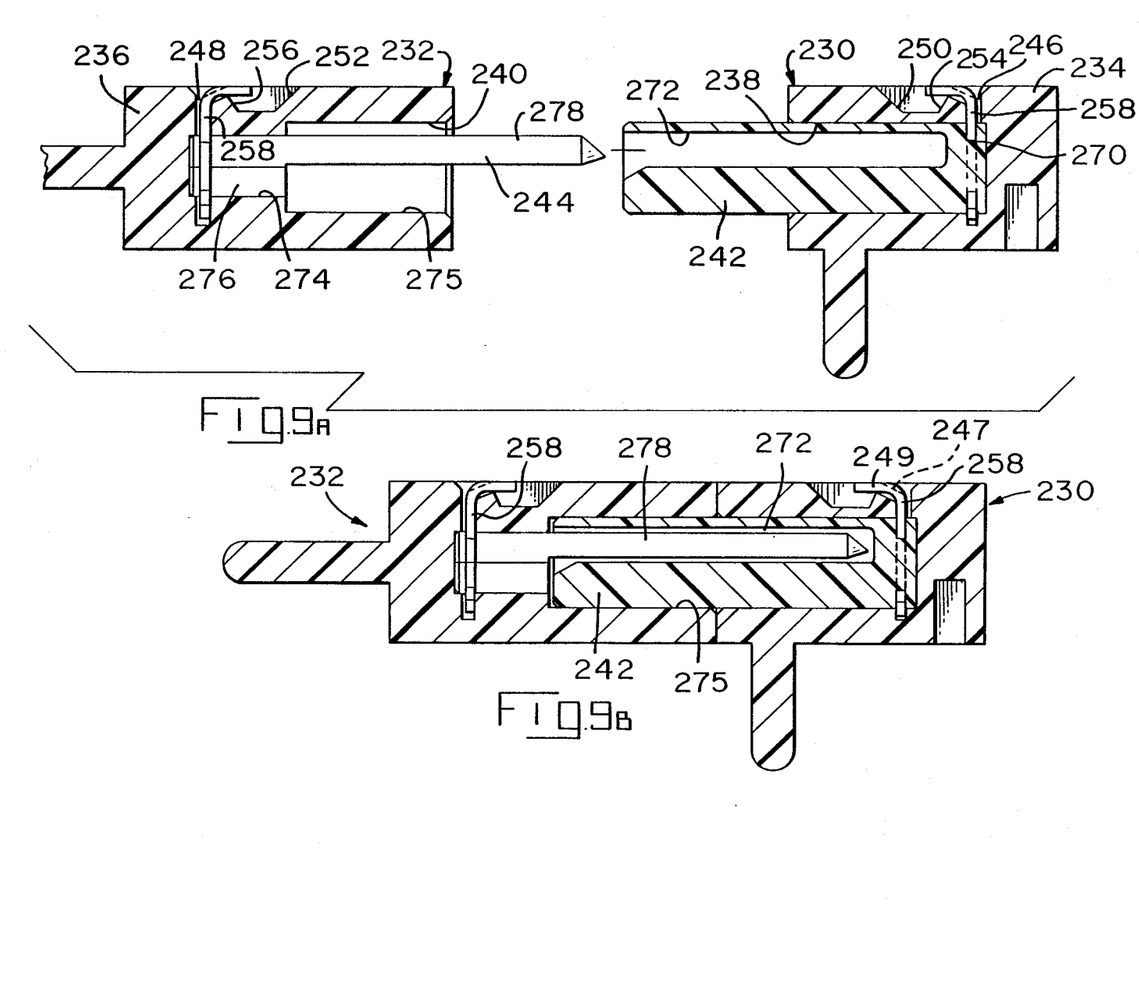
FIGS. 9A and 9B are cross-sectional views of other examples of polarizing modules before and after mating.
Figure 10A:
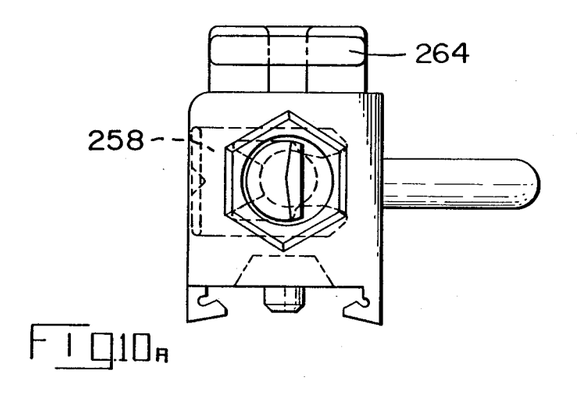
FIGS. 10A and 10B are end views of the polarizing modules shown in FIG. 9.
Figure 10B:
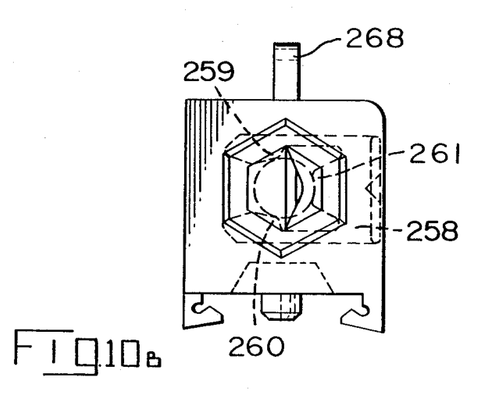
Figure 11:
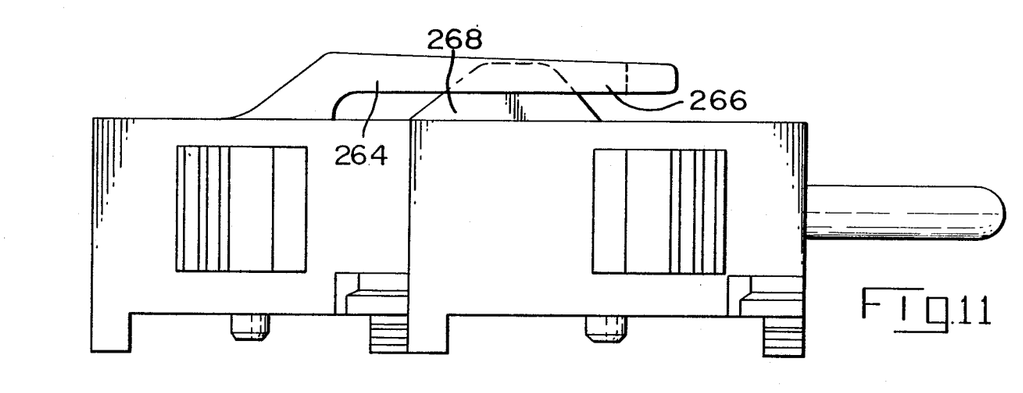
FIG. 11 is a plan view of the mated polarizing modules of FIG. 9.

In second examples of polarizing modules 230, 232 shown in FIGS. 9A and 9B, the housing 234, 236, respectively, are essentially similar in shape to those of the above-described modules, being formed with respective as best seen in FIGS. 10A and 10B hexagonal section cavities 238, 240 receiving a polarizing projection and key 242, 244, respectively, and intersected by snap ring receiving slots 246, 248, respectively. Access recesses 250, 252 are formed with guiding abutment surfaces 254, 256 for a release tool such as the blade of a screwdriver inserted into an eye 247 provided in tab 249 of the ring 258. Each snap ring 258 is formed with three radially inwardly protruding groove engaging lands 259, 260, 261 at a free end of each leg and at a central location, respectively. The end walls of the mating modules are provided with a resilient cantilever latching arm 264 having a latching eye 266 receiving a latching ramp 268 in known manner.

The polarizing projection 242 is moulded of plastic material with a hexagonal section body with a snap ring receiving groove 270 at a rear end and an eccentrically located, axially longitudinally extending key receiving slot 272.

The cavity 240 of module 232 has a hexagonal section counterbore 274 at a rear end of smaller cross-sectional size than a front projection receiving portion 275 receiving a hexagonal section rear body portion 276 of the key 244 which is locked in position in a similar manner to projection 242. A forward mating portion 278 of the key is of semihexagonal section and projects through the front cavity portion 275 at an eccentric location. Both the mating portion 278 of the key and a forward portion of the projection protrude from the mating face beyond mating ends of the other modules and internest when mated, as shown in FIG. 9B, beyond the opposed faces, avoiding a need for an excessively long projection for effective guiding which would arise if a projection from only one module were provided.

In summary, the invention embraces a modular concept which allows intermating of several different kinds of modules in a way which fixes dimensions and allows a preassembly of modules prior to insertion in printed circuit boards, and provides several types of power terminals having themselves features to better assure distribution of current without hot spots, and a particular type of polarization which allows considerable flexibility in adapting to electrical and electronic packaging.

We claim:

1. A modular connector assembly for the distribution of power to a printed circuit board comprising:

pairs of first and second matable individual connector modules, the first connector module of each pair having a pluggable mating face and a board-engaging face and the second connector module of each pair having a complementary pluggable mating face and a board-engaging face, each first individual module of respective pairs being provided with means to link itself with adjacent first modules to form a composite connector body, and each second individual module of respective pairs being provided with means to link itself with adjacent second modules to form a complementary composite connector body; and wherein at least one of the pairs of modules is adapted to carry high current levels, the first connector module of one pair including a terminal with a forward contact portion at a contact face, a body portion extending longitudinally rearwardly from the contact portion, and a series of circuit board connecting post extending from the body portion at longitudinally spaced-apart intervals, successive posts that are of increased separation from the contact portion being of different resistivities thereby to tend to equalize the current flow through such posts to the circuit on the board to which it is mounted.

2. The modular connector assembly as defined in claim 1 in which successive posts of said terminal are of decreasing resistivities.

3. The modular connector assembly as defined in claim 2 in which successive posts are of decreasing effective lengths thereby to decrease their respective resistivities.

4. The modular connector assembly as defined in claim 3 in which the terminal is stamped and formed of sheet metal and the contact portion defines a receptacle having opposed side walls joined by a base wall, the posts extending in two rows from rearward portions of the side walls.

5. The modular connector assembly as defined in claim 4 in which the terminal is disposed in a dielectric housing member having a forward tubular portion and a channel section rearward portion open toward the circuit board, wherein the receptacle extends axially along the tubular portion and the posts extend through the opening in the channel section, said terminal including latch means formed by the rearward portions of the terminal side walls, at a location spaced from the terminal posts, said housing member further including a dielectric cap member with resilient locking legs outstanding therefrom engageable with the latch means to lock the cap member on the rearward end of the housing member to close the rearward end.

6. The modular connector assembly according to claim 5 in which the cap member is formed with a plurality of legs which engage the latch means and the root end of a terminal post, respectively.

7. A terminal for conducting high current between first and second contact interfaces comprising a contact portion for receiving current from a first contact interface, a body portion extending longitudinally away from the mating portion, and a series of circuit board connection posts extending from the body portion at longitudinally spaced-apart intervals, successive posts which are of increased separation from the contact portion being of different resistivities thereby to tend to equalize the current flow through such posts to a second contact interface.

8. The terminal as defined in claim 7 in which successive posts are of decreasing resistivities.

9. The terminal as defined in claim 8 in which successive posts are of decreasing effective lengths thereby to decrease their respective resistivities.

10. The connector module for an assembly as defined in claim 14 comprising an open-ended dielectric housing member having a forward tubular portion and a channel section rearward portion and a terminal having an elongate body with a forward receptacle portion extending axially along the tubular portion and posts extending transversely from a rearward end of the body out of the housing channel mouth, latch means on the rearward ends of the body space from the terminal posts and a dielectric cap member engageable with the latch means in a snap action to lock the cap on the rearward end of the housing member to close the rearward end.

11. The connector module as defined in claim 10 in which the cap member is formed with a plurality of legs which engage the latch means and the root end of a terminal post, respectively.

12. The high current carrying connector module for an assembly as defined in claim 14 comprising a one piece dielectric member comprising an outer wall defining a receptacle having an open front and a projection located centrally within the receptacle and extending towards the front such that a first terminal receiving recess is defined between the wall and the projection; a terminal received in the recess an having a ring of cantilever spring contact fingers extending forwardly around the projection to a location set back from a front end of the projection, such that a terminal of complementary shape to the first terminal can be received in the receptacle in mating electrical engagement therewith, the projection preventing inadvertent manual contact with the first terminal in an unmated condition of the connector module.

* * * * *

UNITED STATES PATENT OFFICE
CERTIFICATE OF CORRECTION

Patent No. 4,820,169  Dated April 11, 1989

Inventor(s) Ronald Martin Weber, et al.

It is certified that error appears in the above-identified patent and that said Letters Patent is hereby corrected as shown below:

In claim 1, column 9, line 29, change "post" to --posts--.

In claim 10, column 10, line 26, change "14" to --1--.

In claim 12, column 10, line 43, change "14" to --1--.

Signed and Sealed this

Fourteenth Day of November, 1989

Attest:

JEFFREY M. SAMUELS

Attesting Officer   Acting Commissioner of Patents and Trademarks